United States Patent [19]
Womack

[11] Patent Number: 5,449,455
[45] Date of Patent: Sep. 12, 1995

[54] CLOSER MECHANISM FOR COMPACT FILTER PRESS ASSEMBLY AND METHOD OF OPERATION

[75] Inventor: Thomas H. Womack, Novato, Calif.

[73] Assignee: Womack International, Inc., Novato, Calif.

[21] Appl. No.: 884,380

[22] Filed: May 18, 1992

[51] Int. Cl.⁶ .......................................... B01D 25/19
[52] U.S. Cl. ..................... 210/224; 210/227; 210/387; 100/269.04
[58] Field of Search ............ 100/269 A, 269 B; 60/428, 486; 210/227, 230, 387, 224

[56] References Cited

U.S. PATENT DOCUMENTS

| | | | |
|---|---|---|---|
| 1,903,887 | 4/1933 | Widener | 60/428 |
| 2,172,002 | 9/1939 | Stanley | 100/269 A |
| 2,339,086 | 1/1944 | Makaroff | 60/428 |
| 2,869,173 | 1/1959 | Hartesveldt et al. | 100/269 A |
| 2,969,148 | 1/1961 | Hirs | 210/387 |
| 3,315,594 | 4/1967 | Simshauser | 100/269 A |
| 3,410,202 | 11/1968 | Chrubasik | 100/269 A |
| 3,763,773 | 10/1973 | Clay | 100/269 A |
| 3,864,266 | 2/1975 | Dietrick | 210/387 |
| 4,159,247 | 6/1979 | Wykoff et al. | 210/387 |
| 4,274,961 | 6/1981 | Hirs | 210/225 |
| 4,289,615 | 9/1981 | Schneider et al. | 210/91 |
| 4,362,617 | 12/1982 | Klepper | 210/225 |
| 4,479,426 | 10/1984 | Olenfalk | 100/37 |

FOREIGN PATENT DOCUMENTS 2527979 12/1983 France ............ 100/269 A

*Primary Examiner*—Matthew O. Savage
*Attorney, Agent, or Firm*—John A. Bucher

[57] ABSTRACT

A closer mechanism and method of operation is provided for filter press assemblies and similar applications having a movable plate for opening and closing the assembly. A flexible bladder is arranged adjacent the movable plate and initially pressurized by a low pressure, high volume supply and then a high pressure, low volume supply regulated by sequencing controls. The flexible bladder is preferably enclosed by a rigid confinement assembly while being allowed to expand and contract for positioning the movable plate. The low pressure supply and high pressure supply are preferably of a gas-over-liquid type while including a reservoir and venting controls for conserving operating liquid within the closer mechanism. In one embodiment, the movable plate is rectangular and the rigid confinement assembly is similarly shaped to provide a particularly compact configuration with the bladder having an inflatable cross-section generally equal in area to the movable plate.

10 Claims, 8 Drawing Sheets

CLOSER MECHANISM FOR COMPACT FILTER PRESS ASSEMBLY AND METHOD OF OPERATION

FIELD OF THE INVENTION

The present invention relates to a closer mechanism and method of operation for its use in opening and closing a movable plate for an assembly including the closer mechanism and more particularly to such a closer mechanism and method of operation employed for positioning a closer plate in a filter assembly.

BACKGROUND OF THE INVENTION

Filter assemblies of the type generally contemplated by the present invention are commonly employed for pressure filtration in industrial applications and the like. The filter assembly is employed to separate solids from liquids in many different applications including, for example, metal-working coolants, food-processing liquids, chemicals, hazardous wastes, etc.

The filter assembly typically comprises a vertical or horizontal stack of filter plates including at least two filter plates, one of which is mounted to a rigid structure or frame. This assembly is also commonly referred to as a filter press. The filter assembly may include two or more such plates, each adjacent pair of plates being adapted for forming a filter chamber.

A layer of filter media, frequently in the form of long sheet-like rolls, is arranged in the filter chamber between each pair of filter plates. Accordingly, each filter chamber formed between adjacent filter plates includes dirty and clean compartments on opposite sides of the filter media. The dirty compartment receives dirty, contaminated liquid under pressure which is forced through the filter media, thereby depositing the filter cake solid particles (with or without a filter aid) on the filter media. The resultant clean, filtered liquid enters the clean compartment of the adjacent plate. Frequently, such filtration operations are supplemented with the addition of filter aids such as diatomaceous earth and/or Fuller's earth, or other similar products. These filter aids create a filter cake on the filter media which facilitates separation of the super-fine particles and color bodies from the liquid in order to further purify the working fluid in the filter assembly.

Filter assemblies including filter stacks with multiple filter chambers or compartments and employing filter media for separating solid particles from a liquid have been disclosed for example in U.S. Pat. No. 4,274,961 issued Jun. 23, 1981 to Hirs; U.S. Pat. No. 4,289,615 issued Sep. 15, 1981 to Schneider, et al. and U.S. Pat. No. 4,362,617 issued Dec. 7, 1982 to Klepper.

The Schneider, et al. and Klepper references noted above also disclose and discuss representative "extractor devices" which are typically used for replacing filter media in the filter chambers. Used filter media extracted from the filter chambers after use may be collected for storage or disposal or may be cleaned and recycled for subsequent reuse in the filter chamber. Such an extractor for extracting spent filter media from filter chambers and reconditioning it for subsequent reuse in the filter chamber is disclosed for example in application Ser. No. 07/716,646 filed Jun. 17, 1991 by the inventor herein for a FILTER ASSEMBLY WITH FILTER MEDIA RETRIEVAL.

Within filter assemblies of the type generally described above and in similar assemblies employed for other applications, it is necessary to provide means for opening the filter chambers when necessary, to extract and replace filter media as noted above, for maintenance of the filter assemblies and for other functions as well.

Particularly in connection with regularly opening the filter chambers in order to replace the spent filter media and then sequentially closing the filter chambers to allow continued operation of the filter press, it is to be noted that the filter plates forming the filter chambers are typically very heavy, often weighing in the range of several hundred pounds. Accordingly, it is necessary to provide a closer mechanism capable of exerting substantial force in order to maintain the filter assembly in closed and sealed relation. At the same time, it is also desirable to provide suitable controls for the closer mechanism so that it can be readily opened and closed to facilitate extraction and/or replacement of the filter media as well as other possible operations within the filter assembly and then to rapidly close the filter assembly in order to permit continued operation of the filter assembly.

Closer mechanisms for opening and closing filter assemblies have commonly been provided in the past. Many of these closer mechanisms are mechanical devices applying mechanical force to a movable plate. Closer mechanisms of this type are disclosed for example by U.S. Pat. No. 294,133 issued Feb. 26, 1884 to Johnson; U.S. Pat. No. 643,900 issued Feb. 20, 1900 to Hotlinger; U.S. Pat. No. 652,588 issued Jun. 26, 1900 to Boag; U.S. Pat. 1,226,103 issued May 15, 1917 to Merrill; and U.S. Pat. No. 2,076,049 issued Apr. 6, 1937 to Seitz.

A variation of mechanical closer devices as described above may include a hydraulically actuated mechanical closer as disclosed for example in U.S. Pat. No. 1,749,080 issued Mar. 4, 1930 to Mathers.

Generally, mechanical closer mechanisms of the type outlined above are relatively massive and provide limited responsiveness in facilitating opening and closing of the filter assembly during repeated cycles as necessary for example where filter media is to be replaced in the filter chambers. In particular, it has been found difficult and/or expensive to rapidly open filter assemblies when they are operated by such mechanical closer mechanisms.

More recently, closer mechanisms employing inflatable bladders to apply closing force have been disclosed for example in U.S. Pat. No. 3,117,083 issued Jan. 7, 1964 to Przhilensky; U.S. Pat. No. 4,172,790 issued Oct. 30, 1979 to Kubo and more recently U.S. Pat. No. 4,479,426 issued Oct. 30, 1984 to Olenfalk.

Of the above references, the Przhilensky patent disclosed a closer mechanism including a rubber tire configuration as the inflatable bladder. A filter press in the Kubo patetit employed a plurality of inflatable bladders or diaphragms arranged between different elements in the filter press assembly.

In the Olenfalk patent, a single inflatable bladder, referred to as a "lifting tool" was employed with a movable yoke in order to permit its use beneath a number of vertical filter press stacks. The lifting tool was sequentially employed for closing each of the filter stacks which were then maintained in a closed condition by a mechanical lock. Thus, the closer mechanism for the filter press stacks in the Olenfalk patent suffered from some of the same disadvantages discussed above in connection with other mechanically operated closer mechanisms.

SUMMARY OF THE INVENTION

Although the filter assemblies and closer mechanisms disclosed by the above references were found to be generally suitable for their intended purposes, there has been found to remain a need for further improvements in closer mechanisms for such filter assemblies and like applications. In particular, it has been found desirable to provide a closer mechanism which can be readily operated by existing sources of energy in a variety of applications. At the same time, it has been found desirable to provide a closer mechanism which can be readily opened and closed either manually or automatically with a minimum amount of supervision required and with rapid operation of the closer mechanism in order to minimize down time of the assembly with which the closer mechanism is being employed. Finally, it is also particularly desirable to provide such a closer mechanism having a relatively compact configuration in order to facilitate its inclusion within a filter press assembly or other assembly while still permitting relatively rapid opening and closing of the assemblies as noted above.

The desirability of such a compact closer mechanism and filter assembly including the closer mechanism is realized in terms of the assembly being readily transportable and capable of installation in a wide range of applications and locations.

In addition to being compact, the closer mechanism for the filter assembly as well as other elements of the overall assembly are contemplated as being adapted for automatic operation to facilitate use of the assembly with minimum supervision.

The closer mechanism of the filter assembly in the present invention is further contemplated to include a diaphragm or bladder mechanism in order to permit both compact construction of the closer mechanism and filter assembly as well as to adapt the closer mechanism for operation by low pressure pneumatic or hydraulic systems commonly available in plants of the type typically requiring the use of such filter assemblies.

The filter assembly of the invention preferably includes a single relatively high pressure filter chamber with filtration occurring upon a filter medium in the form of a roll of sheet material which could readily be replaced, and possibly reused if desired, within tile filter chamber. At the same time, it is contemplated that the filter assembly include a closer mechanism readily operable in an automatic manner as described above without requiring substantial modification at the plant or other location in which the filter assembly is to be located.

For this reason, the closer mechanism is contemplated to include a bladder having an inflatable cross-section (a cross-sectional area in the plane of a movable filter plate for opening and closing the assembly) equal to a substantial portion of the cross-sectional area of the movable filter plate. More preferably, the bladder has a minimum inflatable cross-section equal to at least about 75% of the area of the filter plate and most preferably at least equal to or greater than the area of the filter plate. It is to be noted that the filter chamber or chambers in a typical filter assembly are relatively large, typically having a cross-sectional area of 10–30 square feet in order to provide substantial filtration capacity within each filter chamber.

In any event, with tile bladder having a large cross-sectional area relative to the cross-sectional area of the movable filter plate, it is possible to apply substantial closing forces without requiring excessive pressure within the bladder. In one embodiment of the invention, this permits the bladder to be operated by pressure of the working fluid to be filtered within the assembly.

It is further contemplated that the filter assembly of the present invention employ a square or rectangular filter chamber in order to adapt it for most efficient use of filter media supplied in roll stock. Round filter chambers by comparison would employ only a portion of the provided filter media. In such a preferred filter assembly configuration, the bladder of the closer mechanism would also preferably be square or rectangular so that it has generally the same cross-sectional configuration as the movable plate.

Accordingly, it is also a specific objective of the invention to provide a closer mechanism for an assembly having a rectangular movable plate for opening and closing the filter unit, the closer mechanism including an elastomeric bladder, rigid confinement means laterally surrounding the bladder generally parallel with the closing plate, the rigid confinement means having internal dimensions generally corresponding to the rectangular configuration of the movable plate and positively limiting the bladder means to a minimum inflatable cross-section about equal to an effective closure area of the movable plate while permitting expansion of the bladder perpendicular to the closing plate for applying closing force thereto, a pressure source and sequencing means for controlling opening and closing operations of the closer mechanism.

Such a combination permits a particularly compact configuration for both the closer mechanism and the assembly in which it is included. The rigid confinement means causes the bladder means to have an inflatable cross-section which is about equal to or greater than an effective closure area of the movable plate. Particularly where the assembly is of a type such as a filter assembly wherein fluid pressure is developed within the filter chamber, the rigid confinement means assures that the closing plate will be held in a closed position with pressure in the bladder means being only about equal to or somewhat greater than fluid pressure within the assembly and particularly within a chamber adjacent the movable plate. The so-called effective closure area of the movable plate thus refers to the area of the movable plate exposed to pressure within the assembly.

This combination adapts the closer mechanism for use in a wide variety of applications where it can be operated by a variety of pressure sources requiting only relatively low pressure for operation. More specifically, the pressure source can be either hydraulic or pneumatic. With the pressure source being hydraulic, it can either be based on conventional municipal water pressure as a supply or upon a selfcontained hydraulic loop including a reservoir and a pump for supplying liquid under pressure to the bladder means. With the reservoir having a volume or capacity greater than the volume of the bladder means when inflated, it is possible for the closer mechanism to have a completely self-contained or closed hydraulic operating loop.

It is also possible with such a combination to employ fluid pressure from the assembly itself. For example, where the assembly is a filter press operating to filter liquid which is removed from a tank, the pressure source for the closer mechanism may comprise a pump or the like included in the assembly for pumping processed liquid. Thus, processed liquid may be employed for pressurizing the bladder means and may also be vented back to the process when the bladder means is deflated for opening the assembly.

It is to be understood that the closer mechanism is not limited only for use with filter press assemblies. Rather, the closer mechanism may also be employed with other assemblies similarly having a movable plate for opening and closing the assembly. Accordingly, a closer mechanism as disclosed by the present invention could also be employed in other applications.

It is more specifically an objective of the invention to provide a closer mechanism for filter presses and other assemblies including a movable plate means for opening and closing the assembly, the closer mechanism including a flexible bladder means having an inflatable cross-section equal to a substantial portion, preferably at least 75% and more preferably at least as large as or greater than the cross-sectional area of the movable plate, a pressure source including a low pressure, high volume supply for initially pressurizing the bladder means and a high pressure, low volume supply for subsequently pressurizing the bladder means to supply closing pressure to the movable filter plate, and sequencing means for sequentially operating the low pressure supply and the high pressure source during opening and closing operations of the closer mechanism. A corresponding method of operation for a closer mechanism is also contemplated by the invention.

Preferably, the low pressure and high pressure supplies are hydraulic and more preferably of a gas-over-liquid type. With such a combination, the sequencing means preferably includes means for positively blocking the pressure sources from the bladder when inflated in order to form an incompressible liquid column for positively maintaining the movable plate in a closed position. The ability to form an incompressible liquid column for positively maintaining the movable plate in a closed position is important both in pneumatic/hydraulic systems as well as closer mechanisms which are adapted for hydraulic operation alone.

Means for developing such an incompressible liquid column thus provides a locking means for securing the closing plate in its closed position within the assembly. The sequencing means can be further adapted for momentarily re-pressurizing the bladder means if necessary in case of leakage or the like. Even in closer mechanisms which are not hydraulically operated but are pneumatically operated for example, such a locking means for assuring that the closing plate is held in closed engagement can similarly be accomplished by mechanical means operable for example by solenoids or the like included within the sequencing means.

Also within a gas-over-liquid system as noted above, venting means are also preferably employed for initially venting the bladder means into the high pressure supply in order to recharge it with liquid and then into the low pressure supply. More preferably, the low pressure supply includes a reservoir at least as large as the bladder means when inflated, both the low pressure and high pressure supplies being adapted for venting liquid back to the reservoir in order to conserve hydraulic liquid within the closer mechanism during sequential operations.

It is a related objective of the invention to provide such a closer mechanism including an inflatable bladder means operable in conjunction with a movable plate in the assembly as described above, the closer mechanism further including rigid confinement means for limiting radial expansion of the bladder means, a pressure source for pressurizing the bladder means and sequencing means for regulating opening and closing of the closer mechanism.

More preferably, such a closer mechanism is also provided with a structural surface so that the bladder means is completely enclosed by the movable plate, the structural surface and the rigid confinement means, the rigid confinement means preferably being movable relative to either the movable plate or the structural surface in order to allow for inflation and deflation of the bladder means.

It is yet a further objective of the invention to provide such a closer mechanism which is particularly compact in that the pressure source or sources as well as other components such as the reservoir, sequencing valves and the like are arranged within the structural means in order to provide a particularly compact configuration for the closer mechanism.

Additional objectives and advantages of the invention are made apparent in the following description having reference to the accompanying drawings.

DESCRIPTION OF THE PREFERRED EMBODIMENTS

Figure 1:
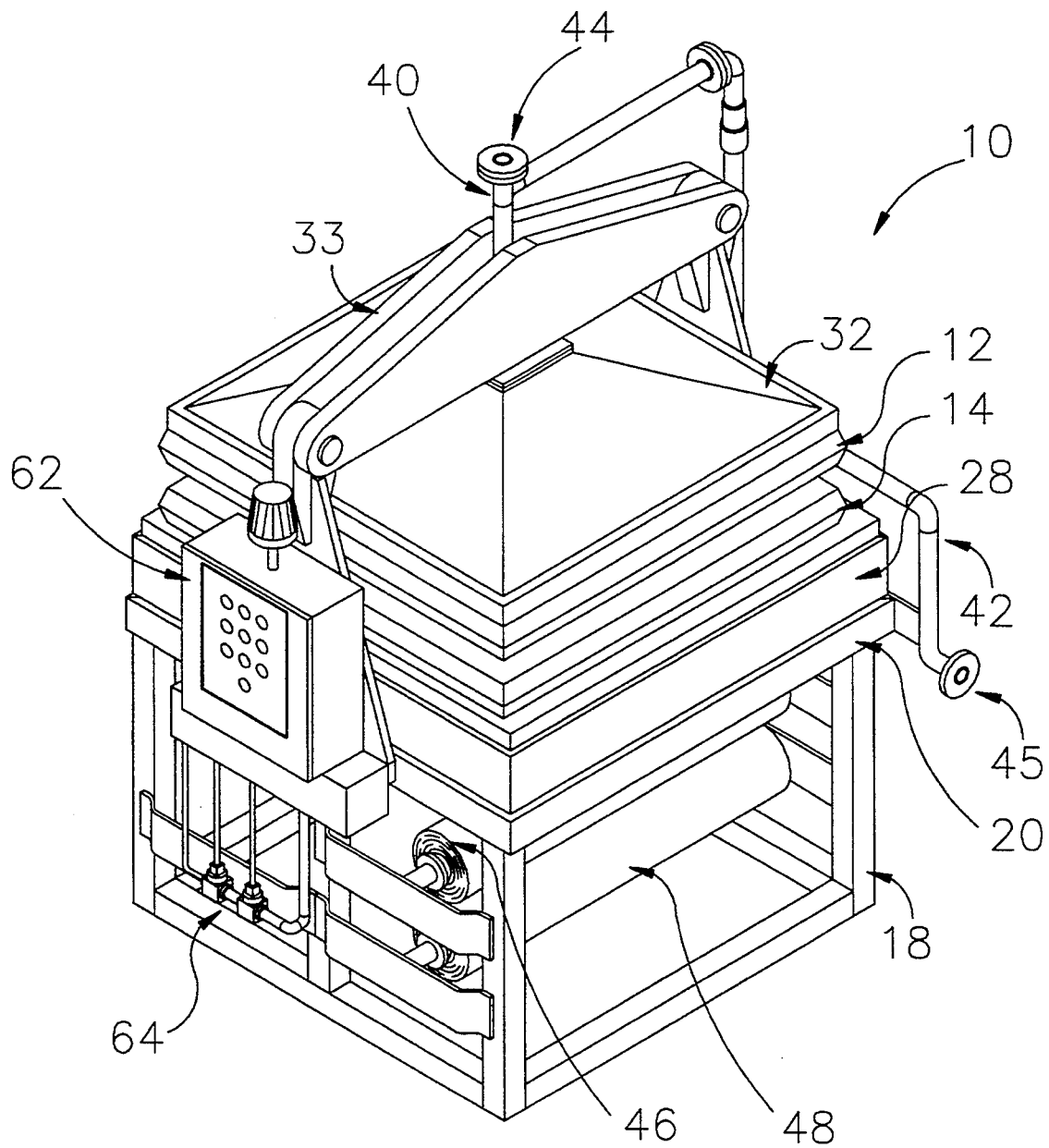
FIG. 1 is a pictorial representation of a compact filter assembly including the compact closer mechanism of the invention.
Figure 2:
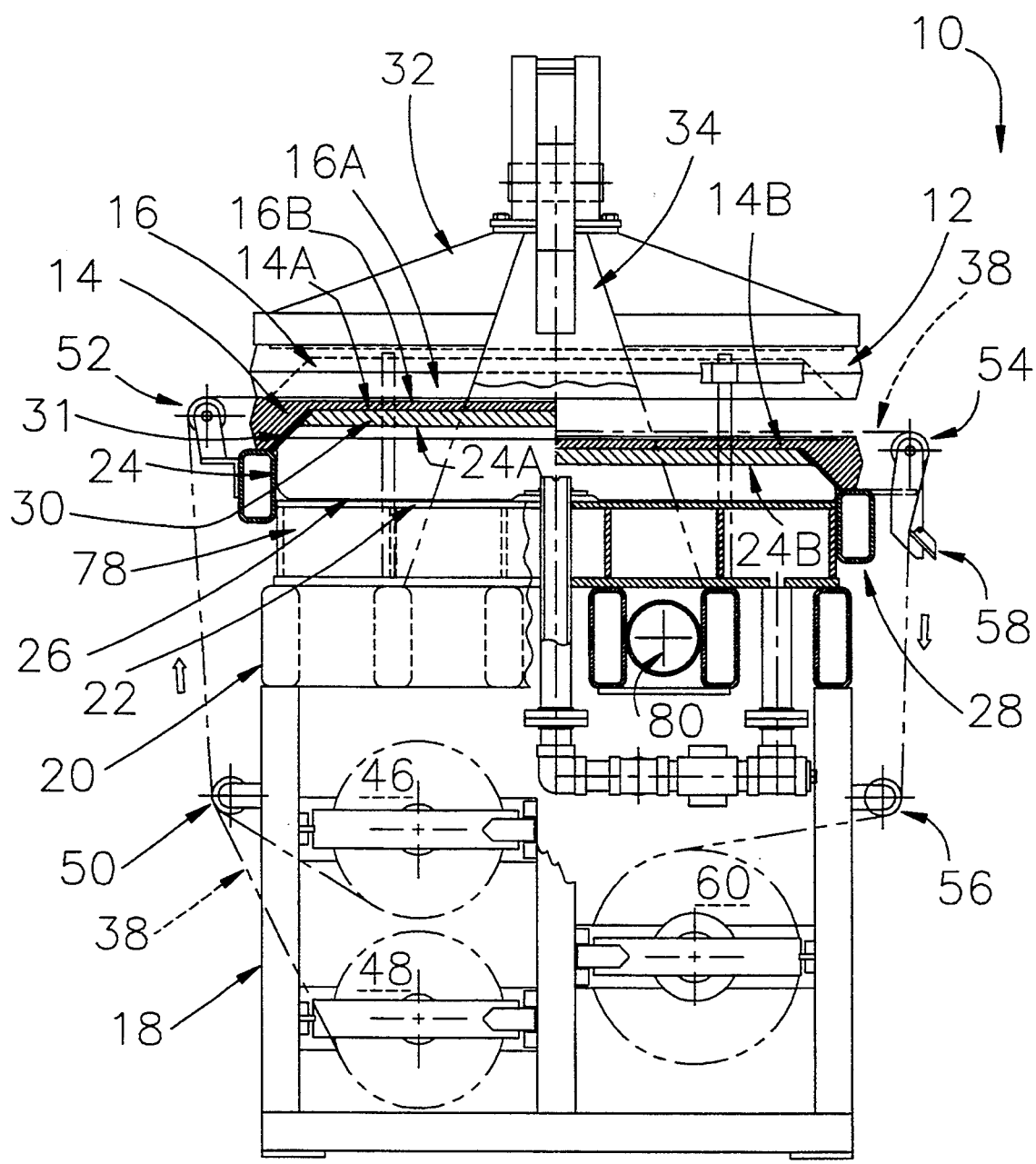
FIG. 2 is a side view in elevation of the filter assembly with parts shown in section to better illustrate the compact configuration of the filter assembly in accordance with the present invention.
Figure 3:
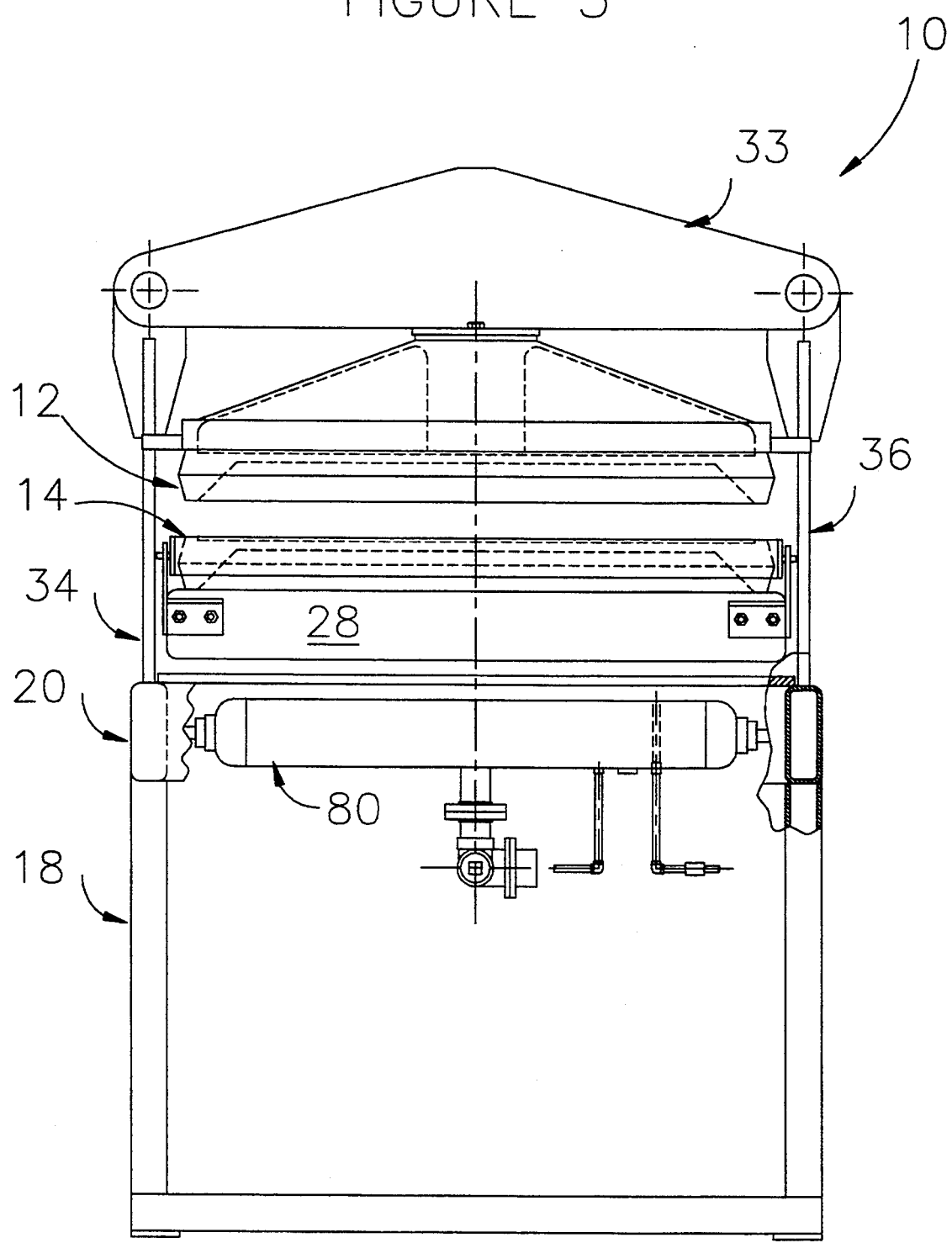
FIG. 3 is an end view of the filter assembly as seen from the right side of FIG. 2.

Referring now to the drawings, the compact configuration of the filter assembly as well as the closer mechanism is best illustrated in FIG. 1, preferably viewed in combination with FIGS. 2 and 3.

Referring to those drawings in combination, the filter assembly is generally indicated at 10 and includes upper and lower filter plates 12 and 14 forming a filter chamber indicated at 16 in FIG. 2. The lower filter plate 14 is movable for opening and closing the filter chamber 16. Referring particularly to FIG. 2, a left hand portion 14A of the lower filter plate is represented in a raised position for closing the chamber 16 while a right hand portion 14B of the lower filter plate is illustrated in a lowered position corresponding to the filter chamber being open.

The filter assembly 10 is supported by a fabricated stand or frame 18 including a rigid structural subassembly 20 positioned beneath the lower filter plate 14 and platen 30. The rigid structural subassembly 20 includes a structural platen 22 generally coextensive with the lower filter plate 14 and rigidly supported therebeneath.

A flexible bladder 24 is arranged between the lower movable filter plate 14 and an upper surface 26 of the structural platen 22 in the structural subassembly 20. The flexible bladder 24 is contemplated to have an inflatable cross-section at least equal to a substantial portion of the cross-sectional area of the movable lower plate 14, more specifically, an effective closure area of the movable plate exposed to fluid pressure within the filter chamber 16. In other words, it is generally contemplated that the flexible bladder 24 has an inflatable cross-section at least equal to about 50% of the cross-sectional area of the lower plate 14. Preferably, the flexible bladder 24 has a cross-sectional area at least equal to about 75% of the cross-sectional area of the movable plate 14 and more preferably, the flexible bladder 24 has a cross-sectional area at least equal to or greater than the cross-sectional area of the lower plate 14 as illustrated in FIGS. 2 and 3.

The flexible bladder 24 is completely enclosed between the lower filter plate 14, and upper surface 26 on the rigid platen 22 of the structural subassembly 20 and a rigid confinement means 28 in the form of a rectangular frame limiting radial movement of the bladder. As shown in FIG. 2, the rigid confinement means is rigidly fixed to the movable plate and surrounds a periphery of the bladder means and a periphery of the structural platen 22. The rigid confinement means 28 is preferably secured to the lower plate 14 while being movable relative to the surface 26 in order to compensate for inflation and deflation of the bladder 24.

The platen 30, secured to the frame 28 by a web 31, is also associated with the lower filter plate 14 in order to assure that the lower filter plate 14 maintains its planar configuration.

The upper filter plate 12 is rigidly supported by a top platen 32, and a strongback 33 secured to the structural subassembly 20 by uprights 34 and 36. With the upper filter plate 12 being rigidly fixed to the platen 32, the lower filter plate 14 is movable between its raised position 14A and its lowered position 14B by inflation or deflation of the bladder 24 respectively in order to either close or open the filter chamber 16. Sequencing means for regulating inflation and deflation of the bladder 24 during operation of the closer mechanism is described in greater detail below. However, it is noted at this point that many of the control components for the bladder are either arranged within the structural subassembly 20 or mounted upon the stand 18 together with the filter assembly 10 in order to provide a very compact configuration for the filter assembly 10 including the closer mechanism described in greater detail below while also making the filter assembly 10 very portable in order to facilitate its installation in a variety of applications and/or sites.

Filter media 38 extends entirely through the filter chamber 16 in order to divide it into an upper chamber 16A and a lower chamber 16B (separated only by the filter media). The upper filter chamber 16A receives dirty or contaminated liquid under pressure through the inlet 40 (see FIG. 1) as described in greater detail below with reference to FIG. 4 so that the liquid is forced through the filter media while the solids or contaminants are collected by the filter media 38 (together with a filter aid if desired or necessary). Collection of solid contaminants and filter aid on the filter media is not illustrated in the drawings in order to better illustrate construction of the filter assembly and closer mechanism of the invention.

The lower filter chamber 16B is thus adapted for receiving clean liquid through the filter media and may accordingly be designated as a clean chamber. The lower chamber 16B is in communication with an outlet 42 for permitting clean liquid to exit from the filter assembly. Referring particularly to FIG. 1, the inlet 40 and outlet 42 are shown with respective flanged connections 44 and 45 to facilitate connection of the filter assembly into process lines when it is installed in a selected site.

The filter media 38 is preferably in the from of an elongated roll available from supply rolls 46 and 48 preferably mounted in the fabricated stand 18. The filter media 38 passes upwardly to the filter chamber 16 over idler rolls 50 and 52. Similarly, the filter media exits from the right side of the filter chamber 16 as viewed for example in FIG. 2 and passes over additional idler rolls 54 and 56 which direct the used filter media to a take-up roll 60. The rolls for supplying and receiving the filter media are conventionally adapted for causing the filter media to be under tension as it passes through the filter chamber 16 in order to assure that the filter media is properly positioned within the chamber.

Otherwise, the operation of the various rolls for supplying filter media to the filter chamber 16 and for extracting the spent filter media from the chamber after use are generally in accordance with the prior art. In this regard, it is to be noted that the filter assembly may also be provided with means such as the straight-edge or doctor blade 58 for cleaning the filter media after use and prior to being taken up on the roll 60. In this manner, the filter media may in some instances be reused in the same manner described above.

Sequencing means for regulating inflation and deflation of the bladder 24 are described in greater detail below with reference to FIG. 4. However, it is noted with reference to FIGS. 1-3 that the sequencing means includes a variety of components which are either:

(a) arranged within the structural subassembly 20 as noted above;
(b) included in a control panel 62 as illustrated in FIG. 1; or
(c) mounted on the fabricated stand or frame 18 in a cluster 64 preferably adjacent the control panel 62. As noted above, the specific components of the sequencing means are described below with reference to the schematic representation of FIG. 4. However, with those components being mounted upon the filter assembly 10 as described above, they further contribute to the compact configuration and portability of the filter assembly 10.

Figure 4:
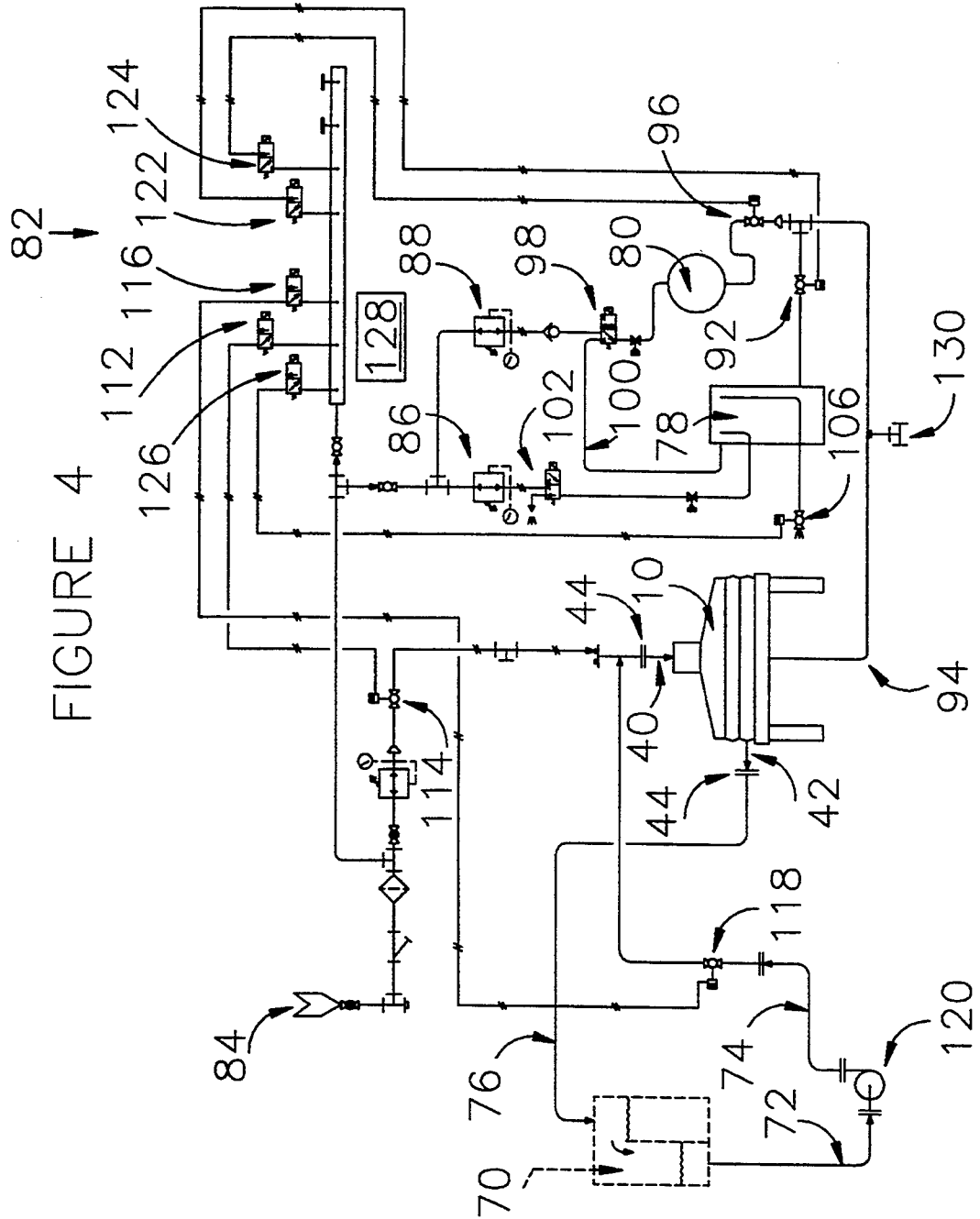
FIG. 4 is a schematic representation of components in the filter assembly and the closer mechanism while better illustrating opening and closing operation of the closer mechanism by pneumatic/hydraulic pressure.

Referring now to the schematic representation of FIG. 4, the filter assembly 10 is illustrated for receiving solids laden liquid from a processing tank 70 and recycling clarified liquid to the tank. Accordingly, an outlet 72 of the tank 70 is connected with the inlet 40 of the filter assembly 10 by a first line 74. The outlet 42 for the filter assembly 10 is connected to the tank by a recycling line 76.

In the configuration illustrated in FIG. 4, the filter assembly 10 is thus employed for continuously filtering liquid from the tank 70 and recycling clarified liquid back to the tank. This operating cycle is interrupted only for removal of spent filter media 38 (see FIGS. 2 and 3) with the closer mechanism of the invention being employed for opening the filter chamber 16 to permit replacement of the filter media 38 and then re-closing the filter chamber to permit continued filtration.

Referring also to FIGS. 2 and 3, the closer mechanism of the present invention includes the flexible bladder 24 together with a low pressure supply 78 and a high pressure supply 80 illustrated in FIG. 2 as well as in the schematic representation of FIG. 4. Sequencing means 82 for regulating the low pressure supply 78 and high pressure supply 80 are generally indicated at 82 in FIG. 4. It is again noted that the components included in the sequencing means 82 are also included in the control panel 62 and component cluster 64 illustrated in FIG. 1.

Basic functions of the closer mechanism of the invention are briefly described below in order to emphasize novel features of the closer mechanism, the low and high pressure supplies 78, 80 and the sequencing means 82.

Both the low pressure supply 78 and the high pressure supply 80 are preferably gas-over-liquid or more typically compressed air-over-water systems enabling them to both function in response to air pressure from a source 84. A first regulator 86 reduces air pressure supplied to the low pressure supply 78 in a low pressure range of up to about 5 psi. A second regulator 88 similarly limits air pressure to the high pressure supply 80 in a high pressure range of up to about 100 psi or higher. Through this arrangement, the filter assembly 10 is readily adapted for operating from pneumatic/hydraulic systems commonly available in most plant sites.

The low pressure supply 78 is preferably a tank or reservoir having a volume at least equal to the inflated volume of the bladder 24 in order to permit the conservation of all hydraulic liquid for the closer mechanism in either the bladder 24 or in the high and low pressure supplies 78 and 80.

The high pressure supply 80 is similarly a high pressure tank also adapted for containing liquid and being pressurized by air as noted above.

Referring also to FIGS. 2 and 3, it is to be noted that the low pressure tank or reservoir 78 is formed within the structural subassembly 20 preferably just below the flexible bladder. The high pressure tank 80 is also arranged in the structural subassembly 20 in order to provide a particularly compact configuration for the filter assembly 10 including the closer mechanism.

With the components arranged as illustrated in FIG. 2, it may be seen that the lower filter plate 14 is raised by inflation of the bladder 24 to a position for closing the filter chamber 16. Because of the substantial weight for the lower filter plate 14, it may also be seen that the lower filter plate will operate under the force of gravity to open the filter chamber 16 when pressure is released from the bladder 24.

Referring again to FIG. 4, the low pressure reservoir 78, is in communication with the diaphragm through a low pressure control valve 92 and a bladder inlet line 94. Similarly, the high pressure supply or tank 80 is in communication with the bladder through a high pressure control valve 96 and the same inlet line 94 in order to supply relatively high pressure liquid to the bladder.

The sequencing means 82 are either manually or automatically adaptable for initiating a closing function of the closer mechanism by first communicating low pressure liquid from the reservoir 78 through the control valve 92 and the inlet line 94 to the bladder at a relatively high flow rate. When the bladder is substantially inflated and the lower filter plate 14 raised upwardly generally into engagement with the upper filter plate 12, the sequencing means then closes the valve 92 and communicates high pressure liquid from the source 80 through the valve 96 to further pressurize the bladder 24 and develop sufficient pressure for maintaining the lower filter plate 14 in a closed position during operation to resist opening when exposed to normal operating pressures in chamber 16. It is important at this point to note that the cross-sectional area of the bladder is substantial relative to the cross-sectional area of the lower filter plate. Preferably, the cross-sectional area of the bladder 24 is at least equal to the cross-sectional area of the lower filter plate 14 so that the relatively low operating pressure even in the high pressure supply 80 is effective for applying very substantial closing force to the lower filter plate.

Further in connection with operation of the bladder and opening of the lower filter plate under gravity, it is noted that both the low pressure and high pressure control valves 92 and 96 are preferably closed after pressurization of the bladder for applying desired closing force to the lower filter plate and thereby forming a means for positively blocking the low pressure and high pressure supplies from the bladder means when the bladder means is inflated in order to form an incompressible liquid column for positively maintaining the movable plate in a closed position. In this manner, a standing hydraulic column is formed in the line 94 forming a locking means for positively maintaining the movable plate in its closed position until the closer mechanism is again operated for opening the assembly for rigidly resisting movement of the lower filter plate even in response to relatively high pressure spikes appearing in the filter chamber 16.

Because the low pressure and high pressure supply 78 and 80 preferably function as gas-over-liquid devices, it is also obvious that substantial gas is introduced into the reservoir 78 and the high pressure tank 80 when the bladder 24 is filled or inflated to close or raise the lower filter plate 14. Accordingly, when it is necessary or desirable to subsequently open or lower the lower filter plate, the line 94 from the bladder is first vented into the high pressure supply 80 by the valve 96. It is noted that a control valve 98 functions either to supply air pressure from the regulator 88 to the high pressure supply 80 during normal operation or to vent the high pressure supply 80 into the low pressure reservoir 78 through a line 100 during clean cycle operations. This serves to refill the high pressure supply 80 with liquid or water so that it will properly function in a subsequent closing cycle. The high pressure supply 80 is vented into the low pressure reservoir 78 through the line 100 so that any liquid vented from the high pressure supply 80 is returned to the low pressure reservoir 78.

After the high pressure supply 80 is recharged with liquid, the valve 96 is closed and the low pressure control valve 92 opened to permit further venting of the bladder into the low pressure reservoir 78. As noted above, the volume of the low pressure reservoir 78 is greater than the volume of the bladder when inflated so that it conserves all liquid from the bladder for reuse in subsequent closing cycles.

When the bladder is being vented through the valve 92 to the low pressure reservoir 78, the low pressure reservoir 78 is vented by its control valve 102 to allow gas or air to escape from the low pressure reservoir to atmosphere.

An additional venting valve 106 is provided for permitting rapid or high volume venting of the low pressure reservoir 78 for more rapid deflation of the bladder and quick opening of the filter assembly.

Referring again to FIGS. 2 and 3, it is again noted that the lower filter plate 14 and, the structural subassembly 20 or more particularly the upper surface 26 function in combination with the rigid confinement means or frame 28 to provide positive confinement for the bladder 24. This preferred feature of the invention assures positive response of the bladder 24 to the low and high pressure supplies 78 and 80. The rigid confinement means or frame 28 thus provides an effective means for developing a precise inflatable cross-section in the bladder 24. This is particularly important for example where the closing plate of the assembly is rectangular or square. In this event, the rigid confinement means similarly forms an internal rectangular cross-sectional area for the bladder about equal to or greater than the effective closure area for the closing plate of the assembly. In this manner, the compact closer mechanism and assembly of the present invention are particularly effective for use in a variety of applications with a relatively low pressure supply being adequate for the closer mechanism. A variety of pressure sources may thus be used as outlined above and described in greater detail herein with reference to the schematic representations of FIGS. 4–8.

Referring again to the schematic representation of FIG. 4, it is to be understood that the sequencing means 82 is of a generally conventional control type including components such as solenoids and the like. The use of such components is well known to those skilled in the art for regulating or sequencing operations such as those indicated above.

In this regard, the sequencing means 82 includes a first solenoid 112 for regulating a valve 114 to control air flow from the source 84 to the filter assembly 10. Another solenoid 116 controls a valve 118 for regulating fluid flow to the filter assembly 10. As illustrated in FIG. 4, process fluid from the tank 70 is supplied to the filter assembly 10 by a pump 120 under regulation of the control valve 118. Solenoids 122 and 124 respectively operate the low pressure and high pressure valves 92 and 96 associated respectively with the low pressure supply 78 and the high pressure supply 80 as described elsewhere herein. A further solenoid 126 operates the vent valve 106 in accordance with the operating description supplied above.

A control means 128 in the form of programmable logic controller is connected with all of the solenoids and sensor means for regulating sequencing operations described herein.

Operating pressures for the closer mechanism are determined by a pressure sensor 130 preferably including a number of pressure sensors for detecting various pressure levels. The pressure sensor 130 is also connected with the control unit 128 to permit overall sequencing of the closer mechanism in conjunction with operation of the filter assembly 10 and processing operations within the tank 70.

Otherwise, it is believed that the sequencing controls briefly summarized above will be clearly apparent to those skilled in the art. Accordingly, no further description of the specific sequencing components is believed necessary for purposes of the present invention.

To more specifically describe an operating cycle for the filter assembly and the closer mechanism of the invention illustrated in FIG. 4, it is initially necessary to assure an adequate supply of clean filter media from the supply rolls 46 or 48. Similarly, it is necessary to assure that sufficient air pressure from the source 84 is available for the high pressure supply 80 as noted above.

In operation, when a predetermined differential pressure is detected across the filter, initiation of a cleaning cycle is commenced either manually or automatically. With the sequencing controls 82 of FIG. 4, it is preferably contemplated in an automatic mode. However, in a "semi-automatic" mode, manual initiation of the cleaning cycle is required. The steps of the cleaning cycle are as follows:

A. Inspection may be carried out to assure that a cleaning cycle is required.
B. If the cleaning cycle is required, a control (not shown) in the control panel 62, is actuated to initiate the cleaning cycle. Thereupon, the cleaning cycle programmer or control 128 carries out the following functions:
1. Solenoid valve 116 is energized for closing the filter inlet valve 118, thus isolating the filter for "blowdown" and "clean-cycle" activities. Filter pump 120 for delivering liquid to the filter is preferably deactivated.
2. Solenoid valve 112 is energized to open the air blowdown control valve 114 which directs blowdown air to the filter inlet chamber 16 to evacuate liquid from the filter chamber. The time interval for step 2 is adjustable and is typically set between two and five minutes but may be increased or decreased as necessary either on a permanent or temporary basis to satisfy needs of the application.
3. Solenoid valve 112 is de-energized to close air blowdown control valve 114 and interrupt blowdown air to the filter assembly. Filter closer hydraulic system pressure switch 130 (circuits A, B and C) is deactivated.
4. Solenoid valve 98 is energized to vent the high pressure hydraulic reservoir 80 through tile low pressure reservoir 78, and then through the solenoid valve V-102 and the normally open low pressure reservoir vent valve V-106, both of which are open, allowing tile low pressure hydraulic reservoir 78 to vent to atmosphere. Then, solenoid valve 124 is energized to open the high pressure control valve 96. Thus, all air in the high pressure hydraulic reservoir is evacuated and replaced with liquid from the bladder means.
5. Solenoid valve 122 is energized to allow control air to open the hydraulic low pressure control valve 92. Thus, all air in the low pressure reservoir is rapidly evacuated and replaced with liquid from the bladder means. As liquid is displaced from the bladder into tile low pressure reservoir the lower filter plate 14 lowers under the influence of gravity and the filter press opens.

C. With the filter press fully opened and void of liquid, that is, with the bladder 24 fully deflated, the spent filter media 38 is manually, or automatically, extracted with replacement filter media being introduced into the filter chamber from the supply rolls 46 or 48.

D. After the spent filter media has been fully extracted from the press, the programmer 128 apparatus manually or automatically carries out the following functions.

6. Filter closer hydraulic system pressure switch 130A (low pressure) and 130B (high pressure) are activated. Solenoid valve 124 is de-energized to allow the high-pressure control valve 96 to close. Solenoid valve 126 is de-energized to allow the low-pressure, hydraulic reservoir vent valve 106 to close.

7. Solenoid valve 102 is energized to pressurize the low-pressure hydraulic system and displace the hydraulic liquid through the low-pressure control valve 92, the inlet line 94, and into the bladder 24 at a relatively high flow rate. As the liquid is displaced to the bladder, the lower filter plate 14 begins to rise and the filter press closes. The pressure switch 130A monitors the low pressure hydraulic system and when a preset pressure, for example about 3 psi, is detected on 130A, solenoid valve 122 is de-energized allowing the control valve 92 to close.

The subsequent step will not occur until the filter press is closed and the above predetermined minimum pressure is detected.

8. Solenoid valve 98 is de-energized to pressurize the high pressure reservoir, and solenoid valve 124 is energized to open the hydraulic high-pressure control valve 96. When a predetermined pressure, for example 60 psi, is detected on pressure switch 130B, the lower filter plate 14 is fully pressurized within the filter press means (the filter press is fully closed), and solenoid valve 124 is de-energized allowing control valve 96 to close forming a rigid hydraulic pressure column on line 94 to the bladder means 24.

Pressure switch 130B continues to monitor the pressure of the hydraulic closer system and upon sensing a pressure less than the 130B low pressure setpoint, the solenoid valve 124 is energized to open the high pressure control valve 96. Upon sensing a pressure greater than the 130B high pressure setpoint, the solenoid valve 124 is de-energized allowing the control valve 96 to close. Thus, this control system reestablishes any internal closer pressure losses within the high pressure closer system.

9. Solenoid valve 116 is de-energized allowing the filter inlet control valve 118 to open. The filter pump 120 is then activated to supply fluid to the filter press. Pressure switch 130C monitors the hydraulic closer system pressure for a loss of pressure. If the hydraulic closer system pressure falls below a predetermined set-point, for example 45 psi, the filter pump 120 is deactivated and a signal is provided for inspection of the system.

10. Solenoid valve 126 is energized to open the low pressure hydraulic reservoir vent valve and solenoid valve 102 is de-energized allowing the low pressure hydraulic reservoir 90 to vent to atmosphere. The closer system is now in the normal operational mode and prepared for the next clean cycle.

FIGS. 5–8 are schematic representations illustrating additional embodiments of the invention with variations of the filter assembly and closer mechanism of FIG. 4. In FIGS. 5–8, the components corresponding to components in FIG. 4 are indicated by similar primed numerals.

Figure 5:
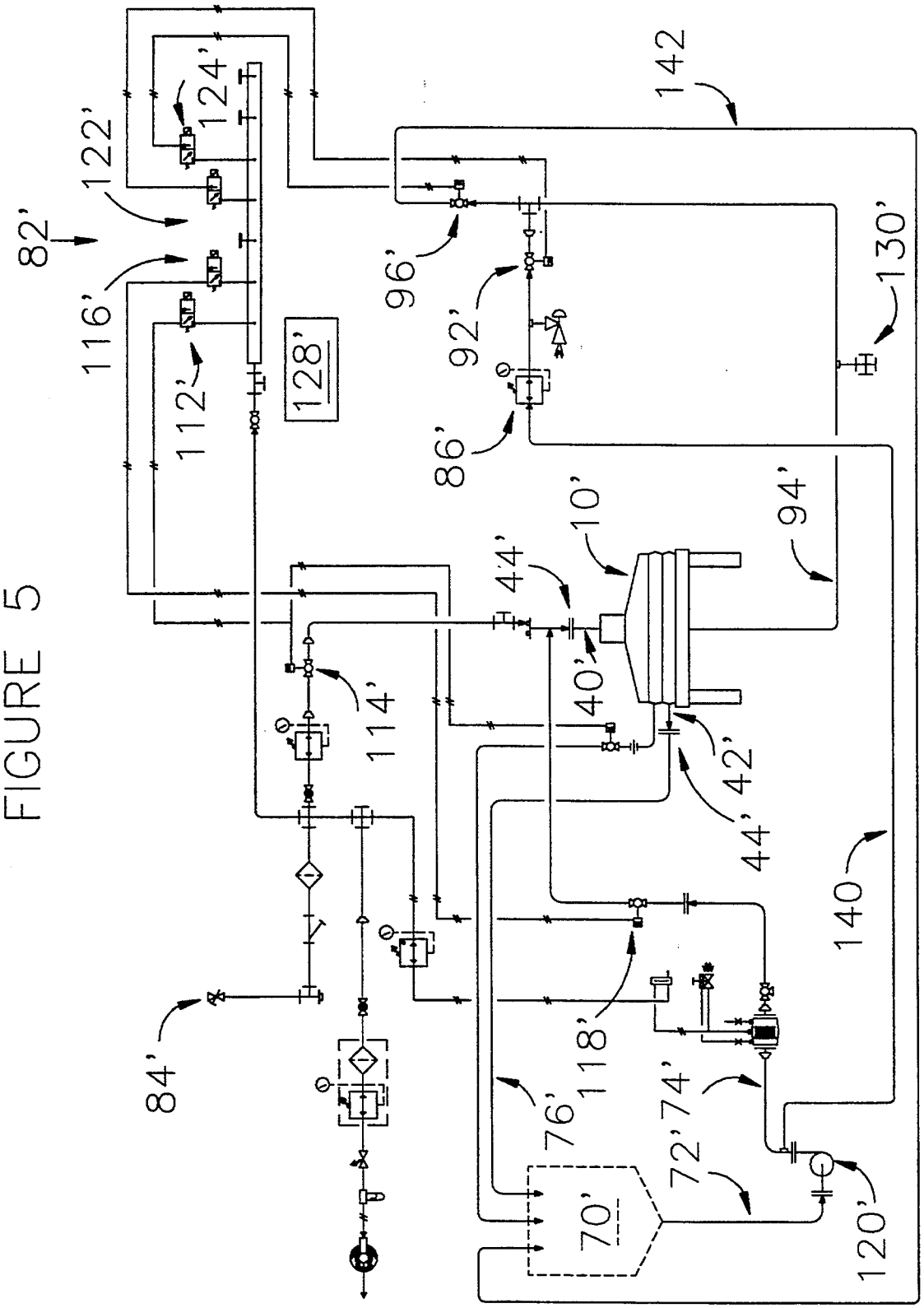
FIG. 5 is also a schematic representation of another embodiment of the filter assembly and closer mechanism wherein the closer mechanism is adapted for operation by process fluid from the filter assembly.

FIG. 5 illustrates an embodiment wherein the bladder (see FIG. 2) is pressurized by process fluid from the tank 70' with pressurization being accomplished by the pump 120'.

Accordingly, the outlet of the pump 120' is in communication with the control valve 92' through a line 140. The valve 92' is in communication with the bladder through the line 94' as in the embodiment of FIG. 4. The other valve 96' continues to be regulated by the solenoid 124' but, in the embodiment of FIG. 5, serves as a relief valve for fluid being exhausted from the bladder during opening of the filter assembly 10'. The valve 96' is connected back to the tank 70' by an exhaust line 142.

Accordingly, the valve assembly and closer mechanism of FIG. 5 operate in generally the same manner described above in connection with the embodiment of FIG. 4. However, in the embodiment of FIG. 5, only the valve 92' is opened for pressurizing the bladder during closing operations for the filter assembly 10'. When the filter assembly 10' is to be opened, the valve 92' is closed by its solenoid 122'. The valve 96' is opened by the solenoid 124' so that fluid from the bladder is returned to the process in the tank 70'.

Figure 6:
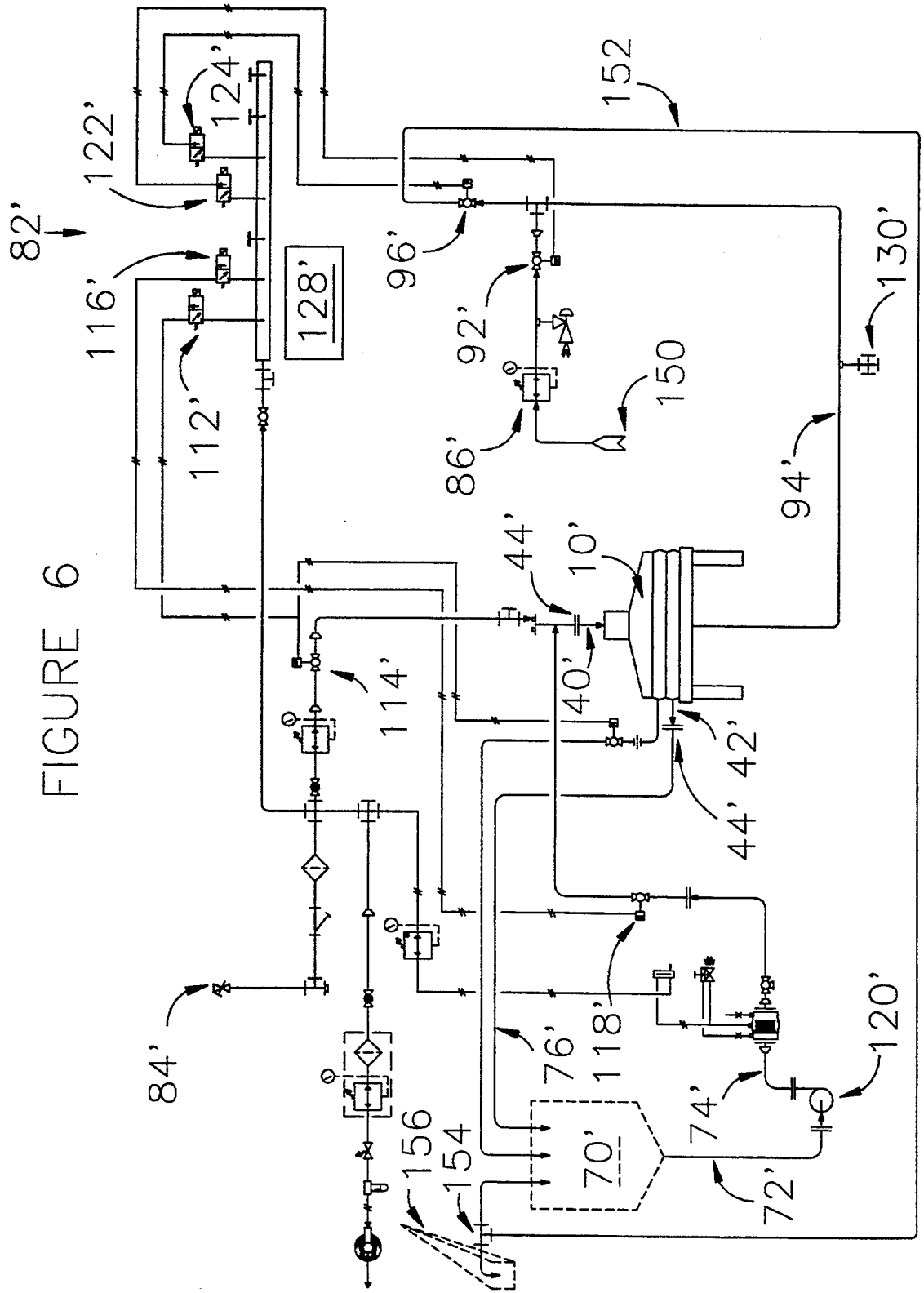
FIG. 6 is also a similar schematic representation of still another embodiment of the filter assembly and closer mechanism of the invention wherein the closer mechanism is operated by municipal water pressure.

FIG. 6 illustrates yet another embodiment of the filter assembly 10' and closer mechanism also illustrated in FIGS. 1–3. The embodiment of FIG. 6 is adapted for hydraulic operation of the bladder in the filter assembly 10' by a conventional low pressure source such as a municipal water supply indicated generally at 150.

Here again, the water supply 150 is in communication with the bladder of the filter assembly 10' through the control valve 92' with the other control valve 96' again serving as a relief valve.

In operation of the embodiment in FIG. 6, the control valve 92' is opened by the solenoid 122' for admitting water pressure from the source 150 to the bladder of the filter assembly 10' during closing of the filter. When the filter is to be opened, the valve 92' is closed and the vent valve 96' opened so that water exhausted from the bladder can be returned to the tank 70' through an exhaust line 152. However, a control valve 154 is provided in the exhaust line 152 for optionally venting water from the bladder to the sewer 156 if desired.

Figure 7:
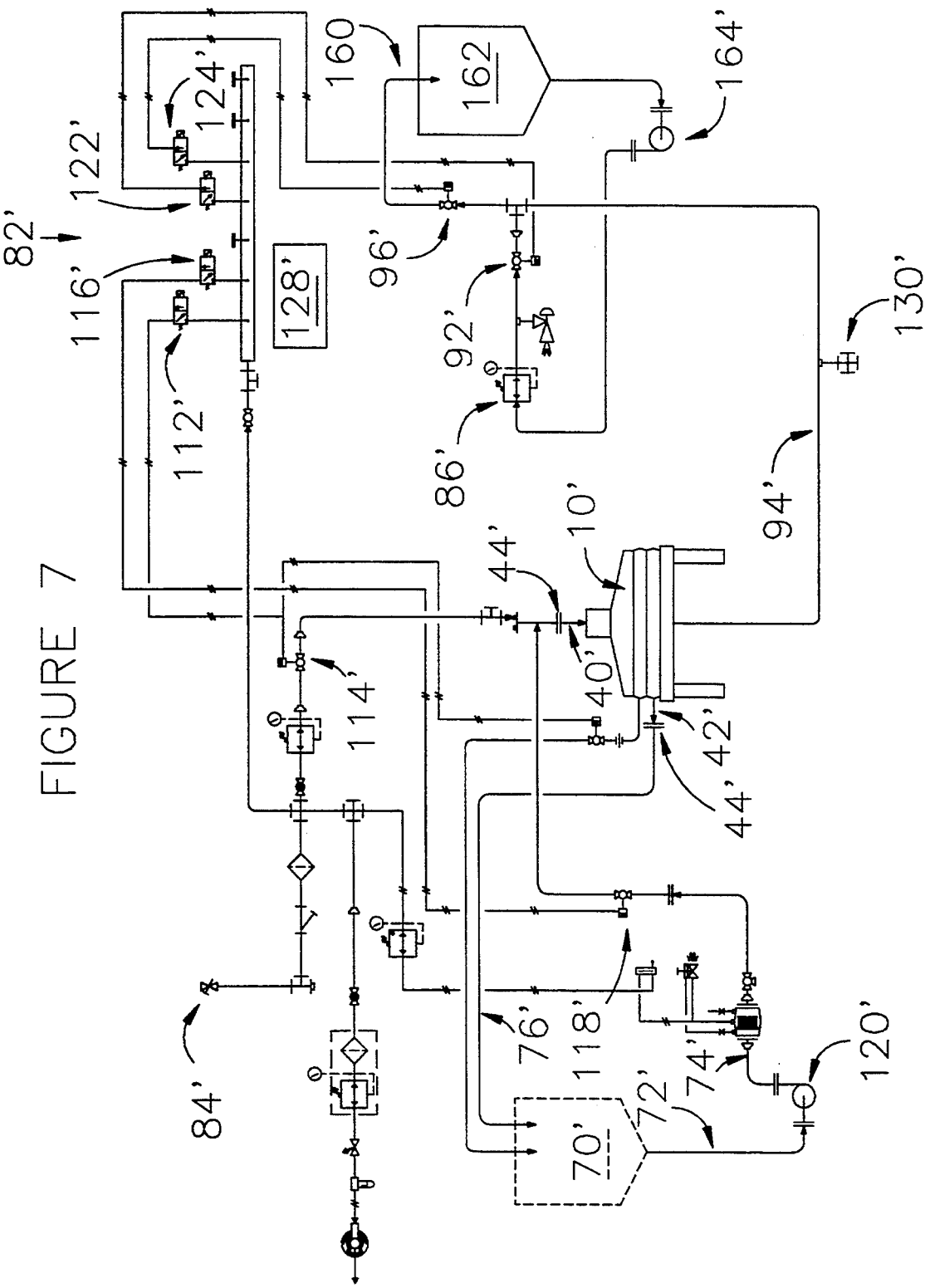
FIG. 7 is also a similar schematic representation of still another embodiment of the filter assembly and closer mechanism wherein the closer mechanism is operated by liquid contained within a closed hydraulic loop.

Still another embodiment of the valve assembly 10' and closer mechanism of FIGS. 1–3 is illustrated in FIG. 7. In this embodiment, the closer mechanism is hydraulically operated by a closed loop 160 including a reservoir 162.

In this embodiment, water or liquid from the reservoir 162 is pressurized by a pump 164. Pressurized liquid from the pump 164 is admitted by the control valve 92' through the line 94' to the bladder of the filter assembly 10' for closing operations as otherwise described above.

When it is desired to open the bladder in the filter assembly 10' of FIG. 7, the valve 92' is closed and the vent valve 96' opened so that liquid exhausted from the bladder of the filter assembly 10' is returned to the reservoir 162. The reservoir 162 preferably has a capacity or volume at least equal to or greater than the volume of the bladder 24 (see FIG. 2) when inflated so that operating liquid for the closer mechanism can be contained within the closed loop 160.

Figure 8:
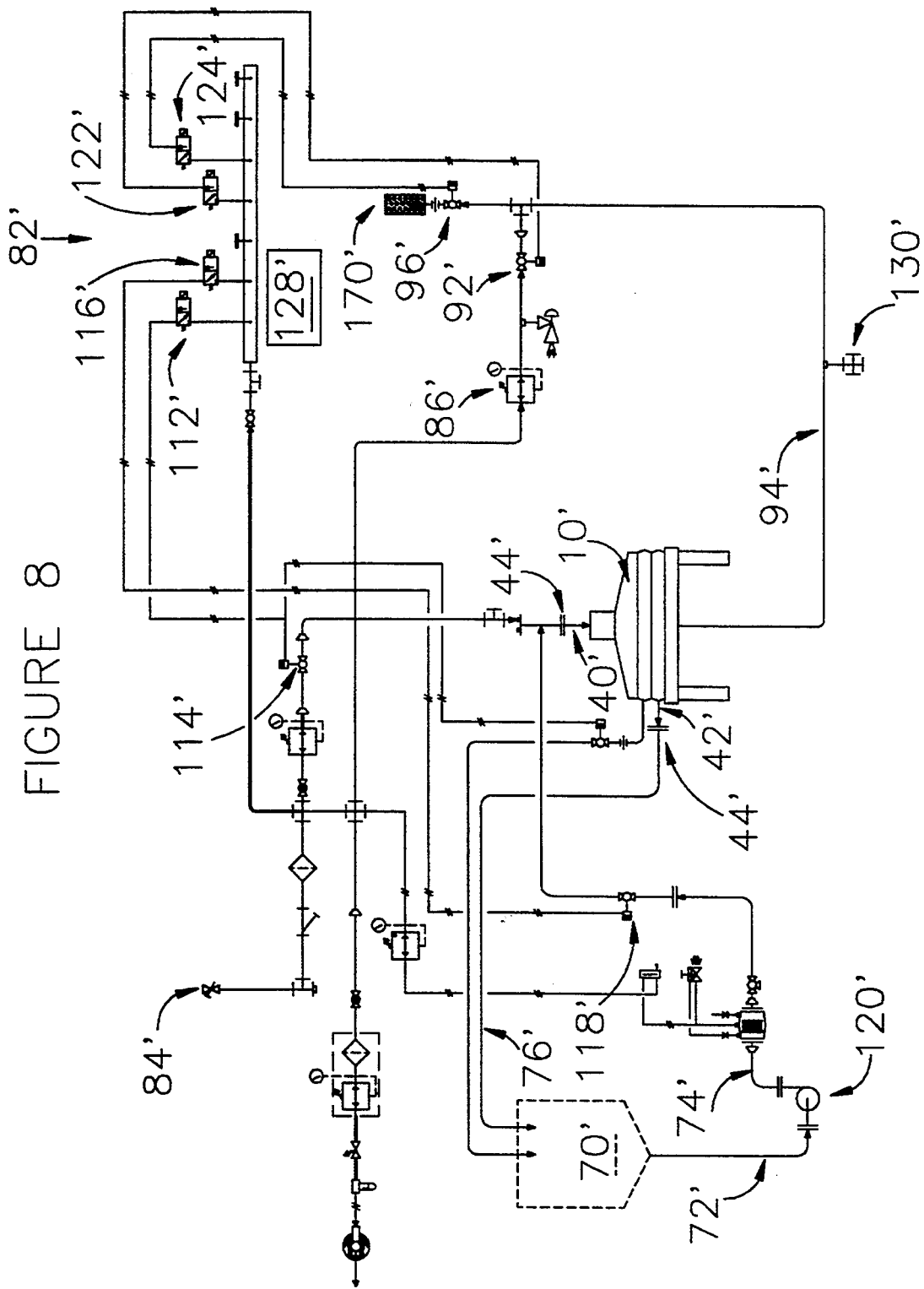
FIG. 8 is still another schematic representation of a further embodiment of the filter assembly and closer mechanism wherein the closer mechanism is operated by pneumatic pressure.

Still another embodiment of the filter assembly 10' and closer mechanism of FIGS. 1–3 is illustrated in FIG. 8. In this embodiment, the bladder (see FIG. 2) for the filter assembly 10' is pneumatically pressurized, preferably by a low pressure pneumatic supply commonly available in most industrial plants and as generally indicated at 84'.

In this embodiment, air pressure from the supply 84' is again communicated to the bladder in the filter assembly 10' by the control valve 92' through the control line 94'. The other control valve 96' is again regulated by the solenoid 124' so that it can open the line 94' to a vent 170.

Thus, in operation, the valve 92' is opened to admit air pressure through the line 94' for inflating the bladder (see FIG. 2) during closing of the filter assembly 10'. Here again, the operation of the closer mechanism and filter assembly 10' is otherwise similar to that described above.

In order to open the filter assembly 10', the control valve 92' is closed and the control valve 96' opened in order to vent air from the bladder through the vent 170.

It is to be noted that, in all of the embodiments illustrated in FIGS. 4–7 which employ hydraulic pressure in the line 94 or 94', a standing hydraulic column can be developed for rigidly resisting opening of the filter assembly 10' in the same manner described above. As also noted above, a similar locking means may also be provided in the pneumatically operated embodiment of FIG. 8 for example by suitable mechanical means (not shown) operated by an additional solenoid similar to those described in the sequencing means 82'.

Accordingly, there have been described above a number of embodiments and variations of a closer mechanism for filter assemblies and the like together with a method of operation whereby the closer mechanism can be operated by low pressure and high pressure gas/liquid sources or by a single gas pressure source if desired. Numerous variations have been described above with additional variations being obvious from the description. Accordingly, the scope of the present invention is defined only by the following claims which are further exemplary of the invention.

What is claimed is:

1. A compact closer mechanism for opening and closing a filter plate assembly, the closer mechanism comprising:

top platen means for defining a fixed top platen;

structural means for defining a fixed structural platen arranged generally parallel to said top platen;

means for rigidly fixing said top platen means to said structural means;

movable plate means arranged generally parallel to and interposed between said top platen means and the structural platen of said structural means for opening and closing the assembly, said movable plate means having a generally rectangular configuration and defining an effective closure area, whereby said assembly is engaged between said top platen and the effective closure area of said movable plate means;

elastomeric bladder means interposed between said movable plate means and said structural platen;

rigid confinement means rigidly fixed to said movable plate means for surrounding a periphery of said bladder means and a periphery of said structural platen, wherein the bladder means is completely enclosed between the movable plate means and the structural platen and said rigid confinement means, the rigid confinement means having internal rectangular dimensions generally similar to the rectangular configuration of the movable plate means for positively limiting expansion of the bladder means to a minimum cross sectional area about equal to an effective closure area of said plate means while limiting expansion of the bladder means in a direction perpendicular to said plate means for applying a closing force to said plate means, whereby said rigid confinement means is movable with said movable plate means and is movable relative to said structural platen in order to compensate for inflation and deflation of the bladder means;

a pressure source connected to said bladder means for providing fluid pressure to inflate the bladder means, wherein said pressure source is arranged within the structural means in order to provide a compact configuration for the closer mechanism; and sequencing means for controlling said pressure source to control an opening and closing operation of the closer mechanism.

2. The compact closer mechanism of claim 1 wherein the flexible bladder means has an inflatible cross-section greater than the surface area of the movable plate means.

3. The compact closer mechanism of claim 1 wherein the pressure source comprises high and low pressure supplies both of a gas-over-liquid type adapted for pressurization by gas with liquid being employed to pressurize the bladder means, the sequencing means sequentially operating the low pressure supply and the high pressure supply during closing and opening operation of the closer mechanism.

4. The compact closer mechanism of claim 3 further comprising means for positively blocking the low pressure and high pressure supplies from the bladder means when the bladder means is inflated in order to form an incompressible liquid column for positively maintaining the movable plate means in a closed position.

5. The compact closer mechanism of claim 4 further comprising venting means operable during opening of the closer mechanism for initially venting the bladder means into the high pressure supply in order to recharge it with liquid, the venting means thereafter venting the bladder means into the low pressure supply and further comprising means for venting the high pressure supply into the low pressure supply so that all liquid is conserved in the hydraulic reservoir of the low pressure supply between closing operations.

6. The closer mechanism of claim 1 wherein the pressure source is a low pressure municipal water supply.

7. The compact closer mechanism of claim 1 wherein the pressure source is a closed liquid loop including reservoir means having a volume greater than the bladder means when inflated, pump means in said closed loop for supplying liquid under pressure to the bladder means, and means for returning liquid from the bladder means to the reservoir means.

8. The compact closer mechanism of claim 1 wherein the pressure source is pneumatically operable.

9. The compact closer mechanism of claim 1 for use in a liquid processing assembly, the pressure source for the closer mechanism comprising pump means for supplying liquid under pressure from the processing assembly to the bladder means, and means for venting liquid from the bladder means back to the processing assembly.

10. The compact closer mechanism of claim 1 further comprising locking means for positively maintaining the movable plate in its closed position until the closer mechanism is again operated for opening the assembly.

* * * * *